United States Patent
Chun et al.

(10) Patent No.: US 10,448,276 B2
(45) Date of Patent: Oct. 15, 2019

(54) METHOD AND TERMINAL FOR PERFORMING ATTACH PROCEDURE FOR SPONSORED CONNECTIVITY IN WIRELESS COMMUNICATION SYSTEM

(71) Applicant: LG ELECTRONICS INC., Seoul (KR)

(72) Inventors: Sungduck Chun, Seoul (KR); Laeyoung Kim, Seoul (KR); Jaehyun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 3 days.

(21) Appl. No.: 15/576,691

(22) PCT Filed: May 26, 2016

(86) PCT No.: PCT/KR2016/005564
§ 371 (c)(1),
(2) Date: Nov. 22, 2017

(87) PCT Pub. No.: WO2016/190672
PCT Pub. Date: Dec. 1, 2016

(65) Prior Publication Data
US 2018/0139797 A1 May 17, 2018

Related U.S. Application Data

(60) Provisional application No. 62/166,142, filed on May 26, 2015.

(51) Int. Cl.
*H04W 28/02* (2009.01)
*H04L 12/24* (2006.01)
(Continued)

(52) U.S. Cl.
CPC ..... *H04W 28/0215* (2013.01); *H04L 41/0681* (2013.01); *H04W 48/12* (2013.01);
(Continued)

(58) Field of Classification Search
CPC . H04L 41/0681; H04L 43/16; H04L 47/2475; H04W 36/0033; H04W 36/08;
(Continued)

(56) References Cited

U.S. PATENT DOCUMENTS

2012/0289151 A1* 11/2012 Wu ................... H04W 60/00
455/39
2013/0244590 A1 9/2013 Nukala et al.
(Continued)

FOREIGN PATENT DOCUMENTS

KR 1020060019799 3/2006
KR 1020130065879 6/2013
(Continued)

OTHER PUBLICATIONS

PCT International Application No. PCT/KR2016/005564, Written Opinion of the International Searching Authority dated Aug. 24, 2016, 17 pages.
(Continued)

*Primary Examiner* — Kan Yuen
(74) *Attorney, Agent, or Firm* — Lee Hong Degerman Kang & Waimey

(57) ABSTRACT

Disclosed is a method and terminal for performing an attach procedure, wherein an attach request message including an APN information request field requesting a notification of an APN which provides sponsored connectivity is transmitted to a network entity, and when an attach reject message including information indicating that the sponsored connectivity cannot be supported and information for a new attach procedure is received, a new attach request message is
(Continued)

transmitted to another network entity on the basis of cell information included in the information for a new attach procedure.

14 Claims, 12 Drawing Sheets

(51) Int. Cl.
| | | |
|---|---|---|
| *H04W 48/12* | (2009.01) | |
| *H04W 76/18* | (2018.01) | |
| *H04W 60/04* | (2009.01) | |
| *H04W 48/14* | (2009.01) | |
| *H04W 48/18* | (2009.01) | |
| *H04L 12/26* | (2006.01) | |
| *H04L 12/859* | (2013.01) | |
| *H04W 28/06* | (2009.01) | |
| *H04W 88/02* | (2009.01) | |
| *H04W 76/12* | (2018.01) | |
| *H04W 48/02* | (2009.01) | |

(52) U.S. Cl.
CPC ........... *H04W 60/04* (2013.01); *H04W 76/18* (2018.02); *H04L 43/16* (2013.01); *H04L 47/2475* (2013.01); *H04W 28/0242* (2013.01); *H04W 28/06* (2013.01); *H04W 48/02* (2013.01); *H04W 48/14* (2013.01); *H04W 48/18* (2013.01); *H04W 76/12* (2018.02); *H04W 88/02* (2013.01)

(58) Field of Classification Search
CPC ... H04W 36/24; H04W 60/005; H04W 76/30; H04W 76/34; H04W 84/042; H04W 84/045
See application file for complete search history.

(56) References Cited

U.S. PATENT DOCUMENTS

| | | | | |
|---|---|---|---|---|
| 2014/0024370 A1* | 1/2014 | Sen | ........................ | H04W 76/18 |
| | | | | 455/435.1 |
| 2014/0133294 A1 | 5/2014 | Horn et al. | | |
| 2014/0295833 A1 | 10/2014 | Rune et al. | | |
| 2016/0007331 A1* | 1/2016 | Gauba | ............... | H04W 72/0406 |
| | | | | 370/329 |
| 2016/0205693 A1* | 7/2016 | Lu | ......................... | H04W 48/18 |
| | | | | 370/329 |

FOREIGN PATENT DOCUMENTS

| | | |
|---|---|---|
| KR | 1020130108436 | 10/2013 |
| WO | 2004036871 | 4/2004 |
| WO | 2012102594 | 8/2012 |

OTHER PUBLICATIONS

PCT International Application No. PCT/KR2016/005558, Written Opinion of the International Searching Authority dated Sep. 22, 2016, 21 pages.

3rd Generation Partnership Project (3GPP), "Technical Specification Group Services and System Aspects; Feasibility Study on Control of Applications when Third party Servers encounter difficulties (Release 14)," 3GPP TR 22.818 V1.0.0, Nov. 2014, 22 pages.

Kddi et al., "Enhancements for control of Applications when Third party Servers encounter difficulties", 3GPP TSG-SA WG1 Meeting #70, S1-151041, Apr. 2015, 3 pages.

\* cited by examiner

METHOD AND TERMINAL FOR PERFORMING ATTACH PROCEDURE FOR SPONSORED CONNECTIVITY IN WIRELESS COMMUNICATION SYSTEM

CROSS-REFERENCE TO RELATED APPLICATIONS

This application is the National Stage filing under 35 U.S.C. 371 of International Application No. PCT/KR2016/005564, filed on May 26, 2016, which claims the benefit of U.S. Provisional Application No. 62/166,142, filed on May 26, 2015, the contents of which are all hereby incorporated by reference herein in its entirety.

TECHNICAL FIELD

Following description relates to a wireless communication system, and more particularly, to a method for a terminal to perform an attach procedure for sponsored connectivity and the terminal.

BACKGROUND ART

Wireless access systems have been widely deployed to provide various types of communication services such as voice or data. In general, a wireless access system is a multiple access system that may support communication of multiple users by sharing available system resources (e.g., a bandwidth, transmission power, etc.). For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a multi carrier frequency division multiple access (MC-FDMA) system.

DISCLOSURE OF THE INVENTION

Technical Tasks

An object of the present invention is to improve a mechanism of an attach procedure to provide sponsored connectivity to a terminal in a mobile communication system such as 3GPP EPS (Evolved Packet System).

Another object of the present invention is to minimize a vacuum of a service provided to a terminal even when sponsored connectivity is not supported to the terminal.

The other object of the present invention is to minimize a load applied to a network system in the process of providing sponsored connectivity.

The technical problems solved by the present invention are not limited to the above technical problems and other technical problems which are not described herein will become apparent to those skilled in the art from the following description.

Technical Solution

To achieve these and other advantages and in accordance with the purpose of the present invention, as embodied and broadly described, according to one embodiment, a method of performing an attach procedure, which is performed by a user equipment (UE) in a wireless communication system, includes the steps of transmitting an attach request message including an APN (access point name) information request field to a network entity to ask the network entity to inform the UE of an APN providing sponsored connectivity, receiving an attach reject message including information indicating that the sponsored connectivity is not supported and information for a new attach procedure from the network entity, and transmitting a new attach request message to a different network entity based on cell information included in the information for the new attach procedure.

The cell information included in the information for the new attach procedure includes frequency band information of a cell capable of immediately providing a service to the UE and information on a cell ID and the information for the new attach procedure can further include PLMN (public land mobile network) information related to the cell information.

The step of transmitting the new attach request message can further include the steps of accessing the cell via a PLMN which is selected according to the PLMN information and transmitting the new attach request message using system information received from the cell.

If an attach accept message including information indicating that the sponsored connectivity is supported is received from the network entity, the method can further include the step of generating a PDN (packet data network) connection according to the attach accept message.

The attach accept message includes a list of APNs where the UE is able to generate sponsored connectivity and APN configuration information related to APNs included in the list of APNs and the step of generating the PDN connection can transmit a PDN connectivity request message to an APN selected from the list of APNs.

The APN configuration information can include at least one selected from the group consisting of identification information of a service mapped to the APNs, category information of the service mapped to the APNs, information on an IP flow or a server connected with the APNs, information on duration of sponsored connectivity supported by the APNs, and information on a condition of the sponsored connectivity supported by the APNs.

The UE may transmit a data packet, which is permitted to be transmitted via the PDN connectivity, to a network only.

To further achieve these and other advantages and in accordance with the purpose of the present invention, according to a different embodiment, a user equipment (UE) performing an attach procedure in a wireless communication system includes a transmitter, a receiver, and a processor configured to operate in a manner of being connected with the transmitter and the receiver, the processor configured to transmit an attach request message including an APN information request field to a network entity to ask the network entity to inform the UE of an APN (access point name) providing sponsored connectivity, the processor configured to receive an attach reject message including information indicating that the sponsored connectivity is not supported and information for a new attach procedure from the network entity, the processor configured to transmit a new attach request message to a different network entity based on cell information included in the information for the new attach procedure.

Advantageous Effects

As is apparent from the above description, the embodiments of the present invention have the following effects.

First of all, it is able to promptly and efficiently establish sponsored connectivity between a terminal and a network by improving a process for generating the sponsored connectivity.

Secondly, it is able to minimize a signaling load between a network and a terminal by performing a signaling process for providing sponsored connectivity to the terminal via an attach procedure.

Thirdly, it is able to minimize an effect on a terminal even when sponsored connectivity is not supported.

The effects of the present invention are not limited to the above-described effects and other effects which are not described herein may be derived by those skilled in the art from the following description of the embodiments of the present invention. That is, effects which are not intended by the present invention may be derived by those skilled in the art from the embodiments of the present invention.

DESCRIPTION OF DRAWINGS

The accompanying drawings, which are included to provide a further understanding of the invention, illustrate embodiments of the invention and together with the description serve to explain the principle of the invention. The technical features of the present invention are not limited to specific drawings and the features shown in the drawings are combined to construct a new embodiment. Reference numerals of the drawings mean structural elements.

BEST MODE

Mode for Invention

Figure 1:
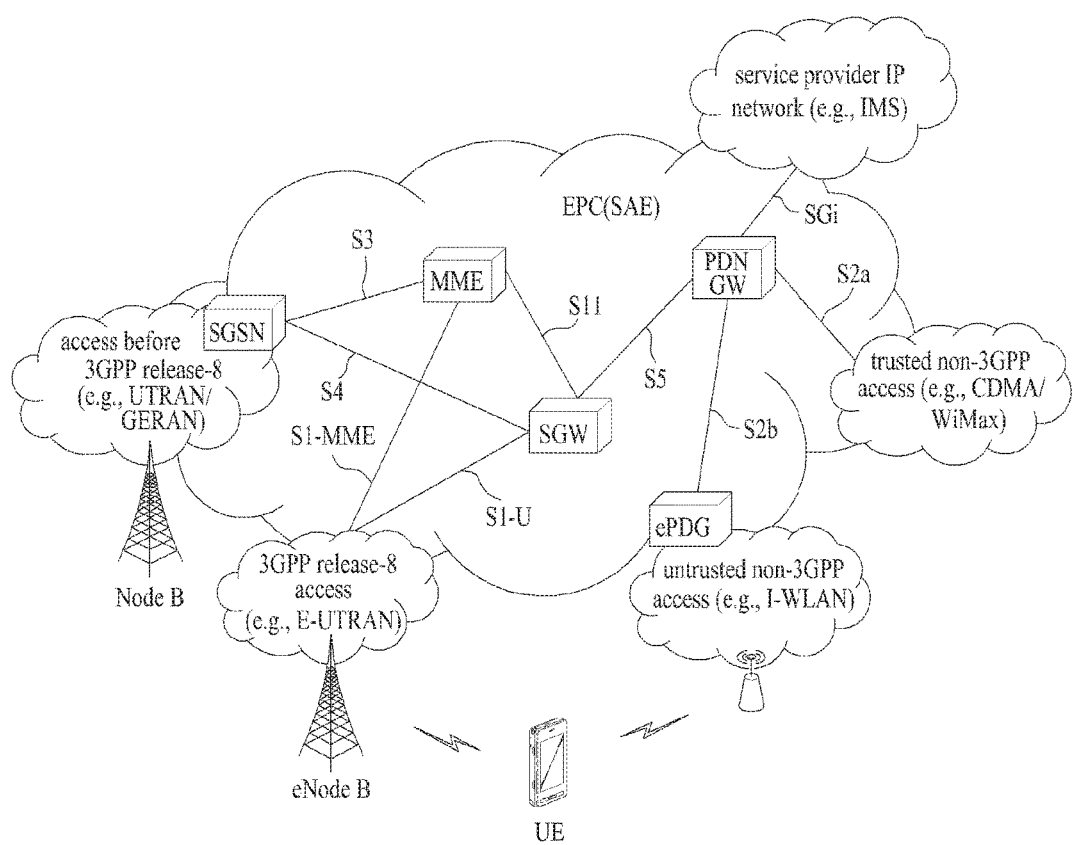
FIG. 1 is a diagram illustrating a brief structure of an evolved packet system (EPS) that includes an evolved packet core (EPC).

Although the terms used in the present invention are selected from generally known and used terms, terms used herein may be varied depending on operator's intention or customs in the art, appearance of new technology, or the like. In addition, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meanings of each term lying within.

The following embodiments are proposed by combining constituent components and characteristics of the present invention according to a predetermined format. The individual constituent components or characteristics should be considered optional factors on the condition that there is no additional remark. If required, the individual constituent components or characteristics may not be combined with other components or characteristics. In addition, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

In describing the present invention, if it is determined that the detailed description of a related known function or construction renders the scope of the present invention unnecessarily ambiguous, the detailed description thereof will be omitted.

In the entire specification, when a certain portion "comprises or includes" a certain component, this indicates that the other components are not excluded and may be further included unless specially described otherwise. The terms "unit", "-or/er" and "module" described in the specification indicate a unit for processing at least one function or operation, which may be implemented by hardware, software or a combination thereof. The words "a or an", "one", "the" and words related thereto may be used to include both a singular expression and a plural expression unless the context describing the present invention (particularly, the context of the following claims) clearly indicates otherwise.

The embodiments of the present invention can be supported by the standard documents disclosed in any one of wireless access systems, such as an IEEE 802.xx system, a 3rd Generation Partnership Project (3GPP) system, a 3GPP Long Term Evolution (LTE) system, and a 3GPP2 system. That is, the steps or portions, which are not described in order to make the technical spirit of the present invention clear, may be supported by the above documents.

In addition, all the terms disclosed in the present document may be described by the above standard documents. In particular, the embodiments of the present invention may be supported by at least one of P802.16-2004, P802.16e-2005, P802.16.1, P802.16p and P802.16.1b documents, which are the standard documents of the IEEE 802.16 system.

Hereinafter, the preferred embodiments of the present invention will be described with reference to the accompanying drawings. It is to be understood that the detailed description which will be disclosed along with the accompanying drawings is intended to describe the exemplary embodiments of the present invention, and is not intended to describe a unique embodiment which the present invention can be carried out.

It should be noted that specific terms disclosed in the present invention are proposed for convenience of description and better understanding of the present invention, and the use of these specific terms may be changed to another format within the technical scope or spirit of the present invention.

First of all, the terms used in this specification can be defined as follows.

UMTS (Universal Mobile Telecommunications System): a GSM (Global System for Mobile Communication)

based third generation mobile communication technology developed by the 3GPP.

EPS (Evolved Packet System): a network system that includes an EPC (Evolved Packet Core) which is an IP (Internet Protocol) based packet switched core network and an access network such as LTE and UTRAN. This system is the network of an evolved version of the UMTS.

NodeB: a base station of GERAN/UTRAN. This base station is installed outdoor and its coverage has a scale of a macro cell.

eNodeB: a base station of LTE. This base station is installed outdoor and its coverage has a scale of a macro cell.

UE (User Equipment): the UE may be referred to as terminal, ME (Mobile Equipment), MS (Mobile Station), etc. Also, the UE may be a portable device such as a notebook computer, a cellular phone, a PDA (Personal Digital Assistant), a smart phone, and a multimedia device. Alternatively, the UE may be a non-portable device such as a PC (Personal Computer) and a vehicle mounted device. The term "UE", as used in relation to MTC, can refer to an MTC device.

HNB (Home NodeB): a base station of UMTS network. This base station is installed indoor and its coverage has a scale of a micro cell.

HeNB (Home eNodeB): a base station of an EPS network. This base station is installed indoor and its coverage has a scale of a micro cell.

MME (Mobility Management Entity): a network node of an EPS network, which performs mobility management (MM) and session management (SM).

PDN-GW (Packet Data Network-Gateway)/PGW: a network node of an EPS network, which performs UE IP address allocation, packet screening and filtering, charging data collection, etc.

SGW (Serving Gateway): a network node of an EPS network, which performs mobility anchor, packet routing, idle-mode packet buffering, and triggering of an MME's UE paging.

NAS (Non-Access Stratum): an upper stratum of a control plane between a UE and an MME. This is a functional layer for transmitting and receiving a signaling and traffic message between a UE and a core network in an LTE/UMTS protocol stack, and supports mobility of a UE, and supports a session management procedure of establishing and maintaining IP connection between a UE and a PDN GW.

PDN (Packet Data Network): a network in which a server supporting a specific service (e.g., a Multimedia Messaging Service (MMS) server, a Wireless Application Protocol (WAP) server, etc.) is located.

PDN connection: a logical connection between a UE and a PDN, represented as one IP address (one IPv4 address and/or one IPv6 prefix).

RAN (Radio Access Network): a unit including a Node B, an eNode B, and a Radio Network Controller (RNC) for controlling the Node B and the eNode B in a 3GPP network, which is present between UEs and provides a connection to a core network.

HLR (Home Location Register)/HSS (Home Subscriber Server): a database having subscriber information in a 3GPP network. The HSS can perform functions such as configuration storage, identity management, and user state storage.

PLMN (Public Land Mobile Network): a network configured for the purpose of providing mobile communication services to individuals. This network can be configured per operator.

Proximity Services (or ProSe Service or Proximity-based Service): a service that enables discovery between physically proximate devices, and mutual direct communication/communication through a base station/communication through the third party. At this time, user plane data are exchanged through a direct data path without through a 3GPP core network (for example, EPC).

ProSe Communication: communication between two or more ProSe-enabled UEs in proximity by means of a ProSe Communication path. Unless explicitly stated otherwise, the term "ProSe Communication" refers to any/all of the following: ProSe E-UTRA Communication, ProSe-assisted WLAN direct communication between two UEs, ProSe Group Communication and ProSe Broadcast Communication.

ProSe E-UTRA Communication: ProSe Communication using a ProSe E-UTRA Communication path.

ProSe-assisted WLAN direct communication: ProSe Communication using a ProSe-assisted WLAN direct communication path.

ProSe Communication path: communication path supporting ProSe Communication. The ProSe E-UTRA Communication path could be established between the ProSe-enabled UEs using E-UTRA, or routed via local eNB(s). The ProSe-assisted WLAN direct communication path may be established directly between the ProSe-enabled UEs using WLAN.

EPC Path (or infrastructure data path): the user plane communication path through EPC.

ProSe Discovery: a process that identifies that a UE that is ProSe-enabled is in proximity of another, using E-UTRA.

ProSe Group Communication: one-to-many ProSe Communication, between more than two ProSe-enabled UEs in proximity, by means of a common communication path established between the ProSe-enabled UEs.

ProSe UE-to-Network Relay: is a form of relay in which a ProSe-enabled Public Safety UE acts as a communication relay between a ProSe-enabled Public Safety UE and the ProSe-enabled network using E-UTRA.

ProSe UE-to-UE Relay: is a form of relay in which a ProSe-enabled Public Safety UE acts as a ProSe Communication relay between two or more ProSe-enabled Public Safety UEs.

Remote UE: This is a Prose-enabled public safety UE connected to EPC through Prose UE-to-Network Relay without service from E-UTRAN in a UE-to-Network Relay operation, that is, Prose-enabled public safety UE configured to receive PDN connection, whereas this is a Prose-enabled public safety UE that performs communication with other Prose-enabled public safety UE through a Prose UE-to-UE Relay in a UE-to-UE relay operation.

ProSe-enabled Network: a network that supports ProSe Discovery, ProSe Communication and/or ProSe-assisted WLAN direct communication. Hereinafter, the ProSe-enabled Network may simply be referred to as a network.

ProSe-enabled UE: a UE that supports ProSe Discovery, ProSe Communication and/or ProSe-assisted WLAN direct communication. Hereinafter, the ProSe-enabled UE and the ProSe-enabled Public Safety UE may be referred to as UE.

Proximity: proximity is determined ("a UE is in proximity of another UE") when given proximity criteria are fulfilled. Proximity criteria can be different for discovery and communication.

SLP(SUPL Location Platform): entity that controls Location Service Management and Position Determination. The SLP includes SLC(SUPL Location Center) function and SPC(SUPL Positioning Center) function. Details of the SLP will be understood with reference to Open Mobile Alliance(OMA) standard document OMA AD SUPL: "Secure User Plane Location Architecture".

USD (User Service Description): application/service layer transmits USD, which includes TMGI (Temporary Mobile Group Identity) for each MBMS service, start and end time of session, frequencies, and MBMS service area identities (MBMS SAIs) information belonging to MBMS service area, to the UE. Details of the USD will be understood with reference to 3GPP TS 23.246.

ISR (Idle mode Signaling Reduction): When a UE frequently moves between E-UTRAN and UTRAN/GERAN, waste of network resources occurs due to a repeated position registration process. As a method for reducing such a waste, when the UE is in an idle mode, after position registration for MME and SGSN (hereinafter, these two nodes will be referred to as mobility management node) is performed through the E-UTRAN and the UTRAN/GERAN, a separate position registration is not performed in the case that movement between two RATs (Radio Access Technologies) which are already registered or cell reselection is performed. Therefore, if DL (downlink) data to the corresponding UE is arrived, paging is transmitted to the E-UTRAN and the UTRAN/GERAN at the same time to successfully discover the UE, whereby the DL data may be transferred to the discovered UE. [see 3GPP TS 23.401 and 3GPP TS 23.060]

Mission Critical Push To Talk: a group communication service that provides a fast establishment time, a capability capable of processing a large scaled group, powerful security, and priority handling.

ANDSF (Access Network Discovery and Selection Function): This is one of network entities for providing a policy for discovering and selecting an access that can be used by a UE on an operator basis.

ISRP (Inter-System Routing Policy): This is a protocol defined by the operator to indicate which one will be used by the UE for routing of IP traffic among several radio access interfaces. The ISRP may include three types of protocols as follows, as a policy for defining an access network preferred (i.e., having a high priority) or restricted to route/steer a packet service (or an IP flow or IP traffic or applications). That is, the ISRP may be divided into an IP flow mobility (IFOM) protocol, a multi access PDN connectivity (MAPCON) protocol, and a non-seamless WLAN offload (NSWO) protocol as follows.

IFOM (IP Flow Mobility) protocol: This protocol is in regards to a list in which access technologies/access networks to be used by the UE are arranged according to a priority, when traffic matched to a specific IP traffic filter can be routed on a specific APN (Access Point Name) or on a random APN. Further, this protocol may designate for which radio access the traffic matched to the specific IP traffic filter is limited on the specific APN or on the random APN.

MAPCON (Multi Access PDN Connectivity) protocol: This protocol is a list in which the access technologies/access networks to be used by the UE are arranged according to the priority when a PDN connection for the specific APN can be routed. Further, this protocol may designate for which radio access a PDN connection to a specific APN will be limited.

NSWO(Non-seamless WLAN offload) protocol: This protocol designates whether certain traffic will be offloaded or not offloaded non-seamlessly to a WLAN.

ISMP (Inter-System Mobility Policy): This is a set of protocols defined by an operator to have an impact on an inter-system mobility decision made by the UE. When the UE can route IP traffic on a single radio access interface, the UE may use ISMP to select the most appropriate access technology type or access network in a given time.

RAN rule: This is a rule received from the network and is called RAN support information. The RAN rule is also called WLAN interworking supported by the RAN used without ANDSF ISRP/ISMP. When the RAN rule for moving traffic to the WLAN is satisfied, an access stratum (AS) layer of the UE delivers a move-traffic-to-WLAN indication and a WLAN identifier together to a higher layer of the UE. Alternatively, when the RAN rule for moving the traffic to the 3GPP access is satisfied, the AS layer of the UE delivers a move-traffic-from-WLAN indication to the higher layer of the UE. 3GPP. 3GPP TS 23.401, TS 23.060, TS 23.402, TS 36.300, TS 36.304, TS 36.331, TS 25.304, and TS 25.331 may be incorporated herein for detailed descriptions on the RAN rule.

Local Operating Environment Information: This is a set of implementation specific parameters which describe the local environment in which the UE is operating.

Network-Based IP Flow Mobility (NBIFOM): This is IP flow mobility based on network based mobility protocol (GTP or PMIP).

UE-initiated NBIFOM: This is NBIFOM in which the UE initiates IP flow mobility.

Network-initiated NBIFOM: This is NBIFOM in which the network initiates IP flow mobility.

Multi-access PDN connection: This is a PDN connection in which traffic can be routed through the 3GPP access and/or the WLAN access. Each IP flow is routed only through one access at one instance.

Routing filter: This is a set of IP header parameter values/ranges of a packet flow used to identify IP flow for the purpose of routing.

Routing access type: This is a type of an access for routing a set of IP flows of PDN connection (3GPP access or WLAN access.

Routing Rule (RR): This is a set of information that enables association between the routing filter and the routing access type.

1. Evolved Packet Core (EPC)

FIG. 1 is a schematic diagram showing the structure of an evolved packet system (EPS) including an evolved packet core (EPC).

The EPC is a core element of system architecture evolution (SAE) for improving performance of 3GPP technology. SAE corresponds to a research project for determining a network structure supporting mobility between various types of networks. For example, SAE aims to provide an optimized packet-based system for supporting various radio access technologies and providing an enhanced data transmission capability.

Specifically, the EPC is a core network of an IP mobile communication system for 3GPP LTE and can support real-time and non-real-time packet-based services. In conventional mobile communication systems (i.e. second-generation or third-generation mobile communication systems), functions of a core network are implemented through a circuit-switched (CS) sub-domain for voice and a packet-switched (PS) sub-domain for data. However, in a 3GPP LTE system which is evolved from the third generation communication system, CS and PS sub-domains are unified into one IP domain. That is, in 3GPP LTE, connection of terminals having IP capability can be established through an IP-based business station (e.g., an eNodeB (evolved Node B)), EPC, and an application domain (e.g., IMS). That is, the EPC is an essential structure for end-to-end IP services.

The EPC may include various components. FIG. 1 shows some of the components, namely, a serving gateway (SGW), a packet data network gateway (PDN GW), a mobility management entity (MME), a serving GPRS (general packet radio service) supporting node (SGSN) and an enhanced packet data gateway (ePDG).

The SGW operates as a boundary point between a radio access network (RAN) and a core network and maintains a data path between an eNodeB and the PDN GW. When. When a terminal moves over an area served by an eNodeB, the SGW functions as a local mobility anchor point. That is, packets. That is, packets may be routed through the SGW for mobility in an evolved UMTS terrestrial radio access network (E-UTRAN) defined after 3GPP release-8. In addition, the SGW may serve as an anchor point for mobility of another 3GPP network (a RAN defined before 3GPP release-8, e.g., UTRAN or GERAN (global system for mobile communication (GSM)/enhanced data rates for global evolution (EDGE) radio access network).

The PDN GW corresponds to a termination point of a data interface for a packet data network. The PDN GW may support policy enforcement features, packet filtering and charging support. In addition, the PDN GW may serve as an anchor point for mobility management with a 3GPP network and a non-3GPP network (e.g., an unreliable network such as an interworking wireless local area network (I-WLAN) and a reliable network such as a code division multiple access (CDMA) or WiMax network).

Although the SGW and the PDN GW are configured as separate gateways in the example of the network structure of FIG. 1, the two gateways may be implemented according to a single gateway configuration option.

The MME performs signaling and control functions for supporting access of a UE for network connection, network resource allocation, tracking, paging, roaming and handover. The MME controls control plane functions associated with subscriber and session management. The MME manages numerous eNodeBs and signaling for selection of a conventional gateway for handover to other 2G/3G networks. In addition, the MME performs security procedures, terminal-to-network session handling, idle terminal location management, etc.

The SGSN handles all packet data such as mobility management and authentication of a user for other 3GPP networks (e.g., a GPRS network).

The ePDG serves as a security node for a non-3GPP network (e.g., an I-WLAN, a Wi-Fi hotspot, etc.).

As described above with reference to FIG. 1, a terminal having IP capabilities may access an IP service network (e.g., an IMS) provided by an operator via various elements in the EPC not only based on 3GPP access but also on non-3GPP access.

Additionally, FIG. 1 shows various reference points (e.g. S1-U, S1-MME, etc.). In 3GPP, a conceptual link connecting two functions of different functional entities of an E-UTRAN and an EPC is defined as a reference point. Table 1 is a list of the reference points shown in FIG. 1. Various reference points may be present in addition to the reference points in Table 1 according to network structures.

TABLE 1

| Reference point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunneling. |
| S5 | It provides user plane tunneling and tunnel management between Serving GW and PDN GW. It is used for Serving GW relocation due to UE mobility and if the Serving GW needs to connect to a non-collocated PDN GW for the required PDN connectivity. |
| S11 | Reference point between an MME and an SGW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

Among the reference points shown in FIG. 1, S2a and S2b correspond to non-3GPP interfaces. S2a is a reference point which provides reliable non-3GPP access and related control and mobility support between PDN GWs to a user plane. S2b is a reference point which provides related control and mobility support between the ePDG and the PDN GW to the user plane.

Figure 2:
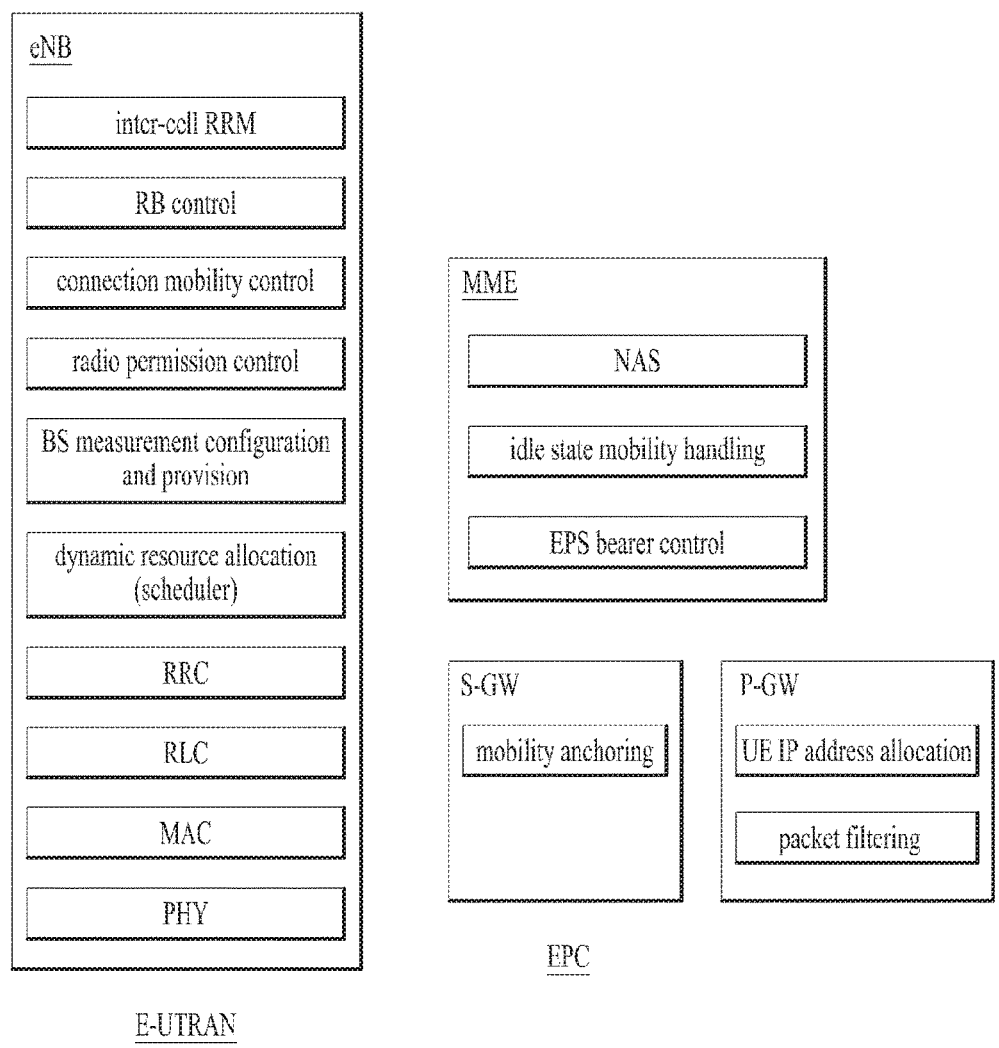
FIG. 2 is an exemplary diagram illustrating an architecture of a general E-UTRAN and a general EPC.

FIG. 2 is a diagram exemplarily illustrating architectures of a typical E-UTRAN and EPC.

As shown in the figure, while radio resource control (RRC) connection is activated, an eNodeB may perform routing to a gateway, scheduling transmission of a paging message, scheduling and transmission of a broadcast channel (BCH), dynamic allocation of resources to a UE on uplink and downlink, configuration and provision of eNodeB measurement, radio bearer control, radio admission control, and connection mobility control. In the EPC, paging generation, LTE_IDLE state management, ciphering of the user plane, SAE bearer control, and ciphering and integrity protection of NAS signaling.

Figure 3:
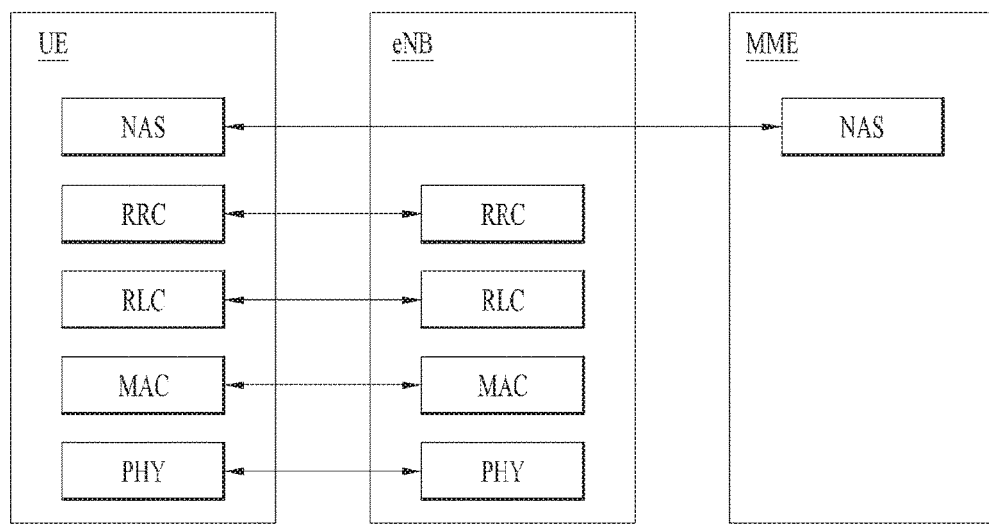
FIG. 3 is an exemplary diagram illustrating a structure of a radio interface protocol on a control plane.
Figure 4:
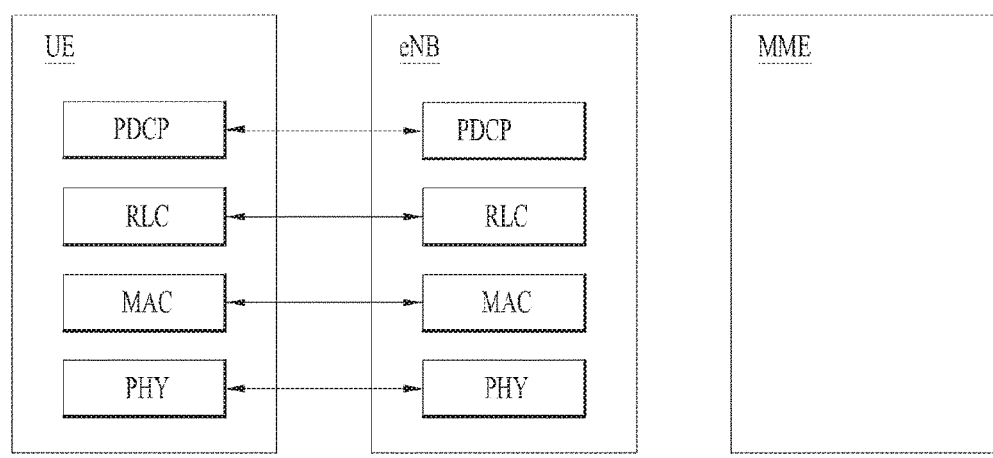
FIG. 4 is an exemplary diagram illustrating a structure of a radio interface protocol on a user plane.

FIG. 3 is a diagram exemplarily illustrating the structure of a radio interface protocol in a control plane between a UE and a base station, and FIG. 4 is a diagram exemplarily illustrating the structure of a radio interface protocol in a user plane between the UE and the base station.

The radio interface protocol is based on the 3GPP wireless access network standard. The radio interface protocol horizontally includes a physical layer, a data link layer, and a networking layer. The radio interface protocol is divided into a user plane for transmission of data information and a control plane for delivering control signaling which are arranged vertically.

The protocol layers may be classified into a first layer (L1), a second layer (L2), and a third layer (L3) based on the three sublayers of the open system interconnection (OSI) model that is well known in the communication system.

Hereinafter, description will be given of a radio protocol in the control plane shown in FIG. 3 and a radio protocol in the user plane shown in FIG. 4.

The physical layer, which is the first layer, provides an information transfer service using a physical channel. The physical channel layer is connected to a medium access control (MAC) layer, which is a higher layer of the physical layer, through a transport channel Data is transferred between the physical layer and the MAC layer through the transport channel Transfer of data between different physical layers, i.e., a physical layer of a transmitter and a physical layer of a receiver is performed through the physical channel.

The physical channel consists of a plurality of subframes in the time domain and a plurality of subcarriers in the frequency domain. One subframe consists of a plurality of symbols in the time domain and a plurality of subcarriers. One subframe consists of a plurality of resource blocks. One resource block consists of a plurality of symbols and a plurality of subcarriers. A Transmission Time Interval (TTI), a unit time for data transmission, is 1 ms, which corresponds to one subframe.

According to 3GPP LTE, the physical channels present in the physical layers of the transmitter and the receiver may be divided into data channels corresponding to Physical Downlink Shared Channel (PDSCH) and Physical Uplink Shared Channel (PUSCH) and control channels corresponding to Physical Downlink Control Channel (PDCCH), Physical Control Format Indicator Channel (PCFICH), Physical Hybrid-ARQ Indicator Channel (PHICH) and Physical Uplink Control Channel (PUCCH).

The second layer includes various layers. First, the MAC layer in the second layer serves to map various logical channels to various transport channels and also serves to map various logical channels to one transport channel. The MAC layer is connected with an RLC layer, which is a higher layer, through a logical channel. The logical channel is broadly divided into a control channel for transmission of information of the control plane and a traffic channel for transmission of information of the user plane according to the types of transmitted information.

The radio link control (RLC) layer in the second layer serves to segment and concatenate data received from a higher layer to adjust the size of data such that the size is suitable for a lower layer to transmit the data in a radio interval.

The Packet Data Convergence Protocol (PDCP) layer in the second layer performs a header compression function of reducing the size of an IP packet header which has a relatively large size and contains unnecessary control information, in order to efficiently transmit an IP packet such as an IPv4 or IPv6 packet in a radio interval having a narrow bandwidth. In addition, in LTE, the PDCP layer also performs a security function, which consists of ciphering for preventing a third party from monitoring data and integrity protection for preventing data manipulation by a third party.

The Radio Resource Control (RRC) layer, which is located at the uppermost part of the third layer, is defined only in the control plane, and serves to configure radio bearers (RBs) and control a logical channel, a transport channel, and a physical channel in relation to reconfiguration and release operations. The RB represents a service provided by the second layer to ensure data transfer between a UE and the E-UTRAN.

If an RRC connection is established between the RRC layer of the UE and the RRC layer of a wireless network, the UE is in the RRC Connected mode. Otherwise, the UE is in the RRC Idle mode.

Hereinafter, description will be given of the RRC state of the UE and an RRC connection method. The RRC state refers to a state in which the RRC of the UE is or is not logically connected with the RRC of the E-UTRAN. The RRC state of the UE having logical connection with the RRC of the E-UTRAN is referred to as an RRC_CONNECTED state. The RRC state of the UE which does not have logical connection with the RRC of the E-UTRAN is referred to as an RRC_IDLE state. A UE in the RRC_CONNECTED state has RRC connection, and thus the E-UTRAN may recognize presence of the UE in a cell unit. Accordingly, the UE may be efficiently controlled. On the other hand, the E-UTRAN cannot recognize presence of a UE which is in the RRC_IDLE state. The UE in the RRC_IDLE state is managed by a core network in a tracking area (TA) which is an area unit larger than the cell. That is, for the UE in the RRC_IDLE state, only presence or absence of the UE is recognized in an area unit larger than the cell. In order for the UE in the RRC_IDLE state to be provided with a usual mobile communication service such as a voice service and a data service, the UE should transition to the RRC_CONNECTED state. A TA is distinguished from another TA by a tracking area identity (TAI) thereof. A UE may configure the TAI through a tracking area code (TAC), which is information broadcast from a cell.

When the user initially turns on the UE, the UE searches for a proper cell first. Then, the UE establishes RRC connection in the cell and registers information thereabout in the core network. Thereafter, the UE stays in the RRC_IDLE state. When necessary, the UE staying in the RRC_IDLE state selects a cell (again) and checks system information or paging information. This operation is called camping on a cell. Only when the UE staying in the RRC_IDLE state needs to establish RRC connection, does the UE establish RRC connection with the RRC layer of the E-UTRAN through the RRC connection procedure and transition to the RRC_CONNECTED state. The UE staying in the RRC_IDLE state needs to establish RRC connection in many cases. For example, the cases may include an attempt of a user to make a phone call, an attempt to transmit data, or transmission of a response message after reception of a paging message from the E-UTRAN.

The non-access stratum (NAS) layer positioned over the RRC layer performs functions such as session management and mobility management.

Hereinafter, the NAS layer shown in FIG. 3 will be described in detail.

The eSM (evolved Session Management) belonging to the NAS layer performs functions such as default bearer management and dedicated bearer management to control a UE to use a PS service from a network. The UE is assigned a default bearer resource by a specific packet data network (PDN) when the UE initially accesses the PDN. In this case, the network allocates an available IP to the UE to allow the UE to use a data service. The network also allocates QoS of a default bearer to the UE. LTE supports two kinds of bearers. One bearer is a bearer having characteristics of guaranteed bit rate (GBR) QoS for guaranteeing a specific bandwidth for transmission and reception of data, and the other bearer is a non-GBR bearer which has characteristics of best effort QoS without guaranteeing a bandwidth. The default bearer is assigned to a non-GBR bearer. The dedicated bearer may be assigned a bearer having QoS characteristics of GBR or non-GBR.

A bearer allocated to the UE by the network is referred to as an evolved packet service (EPS) bearer. When the EPS bearer is allocated to the UE, the network assigns one ID. This ID is called an EPS bearer ID. One EPS bearer has QoS characteristics of a maximum bit rate (MBR) and/or a guaranteed bit rate (GBR).

Figure 5:
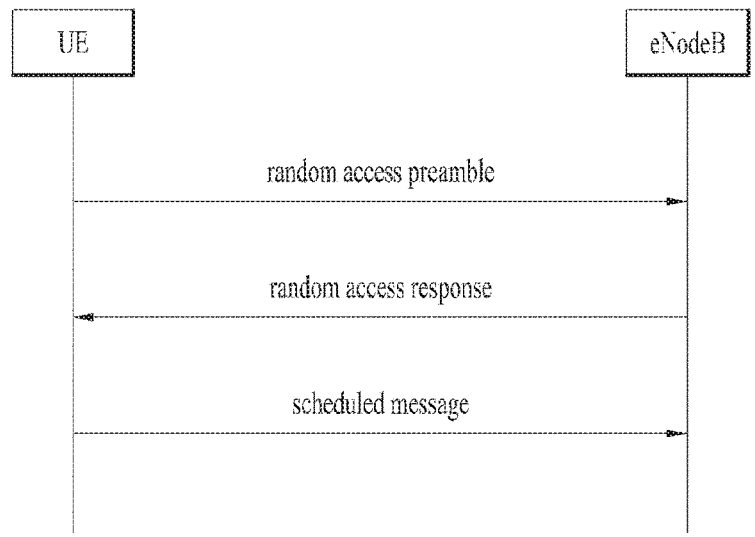
FIG. 5 is a flow chart illustrating a random access procedure.

FIG. 5 is a flowchart illustrating a random access procedure in 3GPP LTE.

The random access procedure is performed for a UE to obtain UL synchronization with an eNB or to be assigned a UL radio resource.

The UE receives a root index and a physical random access channel (PRACH) configuration index from an eNodeB. Each cell has 64 candidate random access preambles defined by a Zadoff-Chu (ZC) sequence. The root index is a logical index used for the UE to generate 64 candidate random access preambles.

Transmission of a random access preamble is limited to a specific time and frequency resources for each cell. The PRACH configuration index indicates a specific subframe and preamble format in which transmission of the random access preamble is possible.

The UE transmits a randomly selected random access preamble to the eNodeB. The UE selects a random access preamble from among 64 candidate random access preambles and the UE selects a subframe corresponding to the PRACH configuration index. The UE transmits the selected random access preamble in the selected subframe.

Upon receiving the random access preamble, the eNodeB sends a random access response (RAR) to the UE. The RAR is detected in two steps. First, the UE detects a PDCCH masked with a random access (RA)-RNTI. The UE receives an RAR in a MAC (medium access control) PDU (protocol data unit) on a PDSCH indicated by the detected PDCCH.

Figure 6:
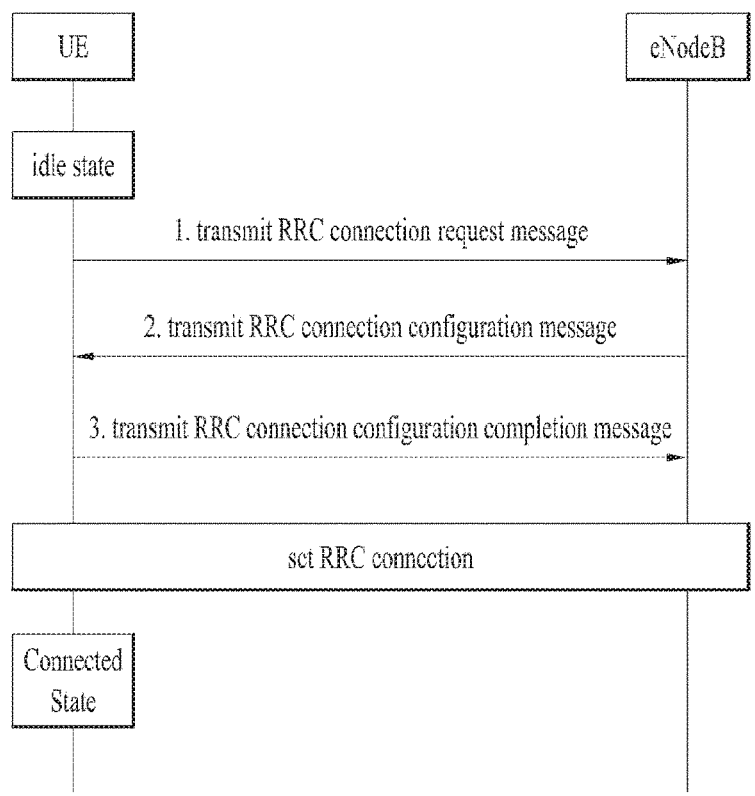
FIG. 6 is a diagram illustrating a connection procedure in a radio resource control (RRC) layer.

FIG. 6 illustrates a connection procedure in a radio resource control (RRC) layer.

As shown in FIG. 6, the RRC state is set according to whether or not RRC connection is established. An RRC state indicates whether or not an entity of the RRC layer of a UE has logical connection with an entity of the RRC layer of an eNodeB. An RRC state in which the entity of the RRC layer of the UE is logically connected with the entity of the RRC layer of the eNodeB is called an RRC connected state. An RRC state in which the entity of the RRC layer of the UE is not logically connected with the entity of the RRC layer of the eNodeB is called an RRC idle state.

A UE in the Connected state has RRC connection, and thus the E-UTRAN may recognize presence of the UE in a cell unit. Accordingly, the UE may be efficiently controlled. On the other hand, the E-UTRAN cannot recognize presence of a UE which is in the idle state. The UE in the idle state is managed by the core network in a tracking area unit which is an area unit larger than the cell. The tracking area is a unit of a set of cells. That is, for the UE which is in the idle state, only presence or absence of the UE is recognized in a larger area unit. In order for the UE in the idle state to be provided with a usual mobile communication service such as a voice service and a data service, the UE should transition to the connected state.

When the user initially turns on the UE, the UE searches for a proper cell first, and then stays in the idle state. Only when the UE staying in the idle state needs to establish RRC connection, the UE establishes RRC connection with the RRC layer of the eNodeB through the RRC connection procedure and then performs transition to the RRC connected state.

The UE staying in the idle state needs to establish RRC connection in many cases. For example, the cases may include an attempt of a user to make a phone call, an attempt to transmit data, or transmission of a response message after reception of a paging message from the E-UTRAN.

In order for the UE in the idle state to establish RRC connection with the eNodeB, the RRC connection procedure needs to be performed as described above. The RRC connection procedure is broadly divided into transmission of an RRC connection request message from the UE to the eNodeB, transmission of an RRC connection setup message from the eNodeB to the UE, and transmission of an RRC connection setup complete message from the UE to eNodeB, which are described in detail below with reference to FIG. 6.

1) When the UE in the idle state desires to establish RRC connection for reasons such as an attempt to make a call, a data transmission attempt, or a response of the eNodeB to paging, the UE transmits an RRC connection request message to the eNodeB first.

2) Upon receiving the RRC connection request message from the UE, the ENB accepts the RRC connection request of the UE when the radio resources are sufficient, and then transmits an RRC connection setup message, which is a response message, to the UE.

3) Upon receiving the RRC connection setup message, the UE transmits an RRC connection setup complete message to the eNodeB. Only when the UE successfully transmits the RRC connection setup message, does the UE establish RRC connection with the eNodeB and transition to the RRC connected mode.

2. SCEF (Service Capability Exposure Function)

Figure 7:
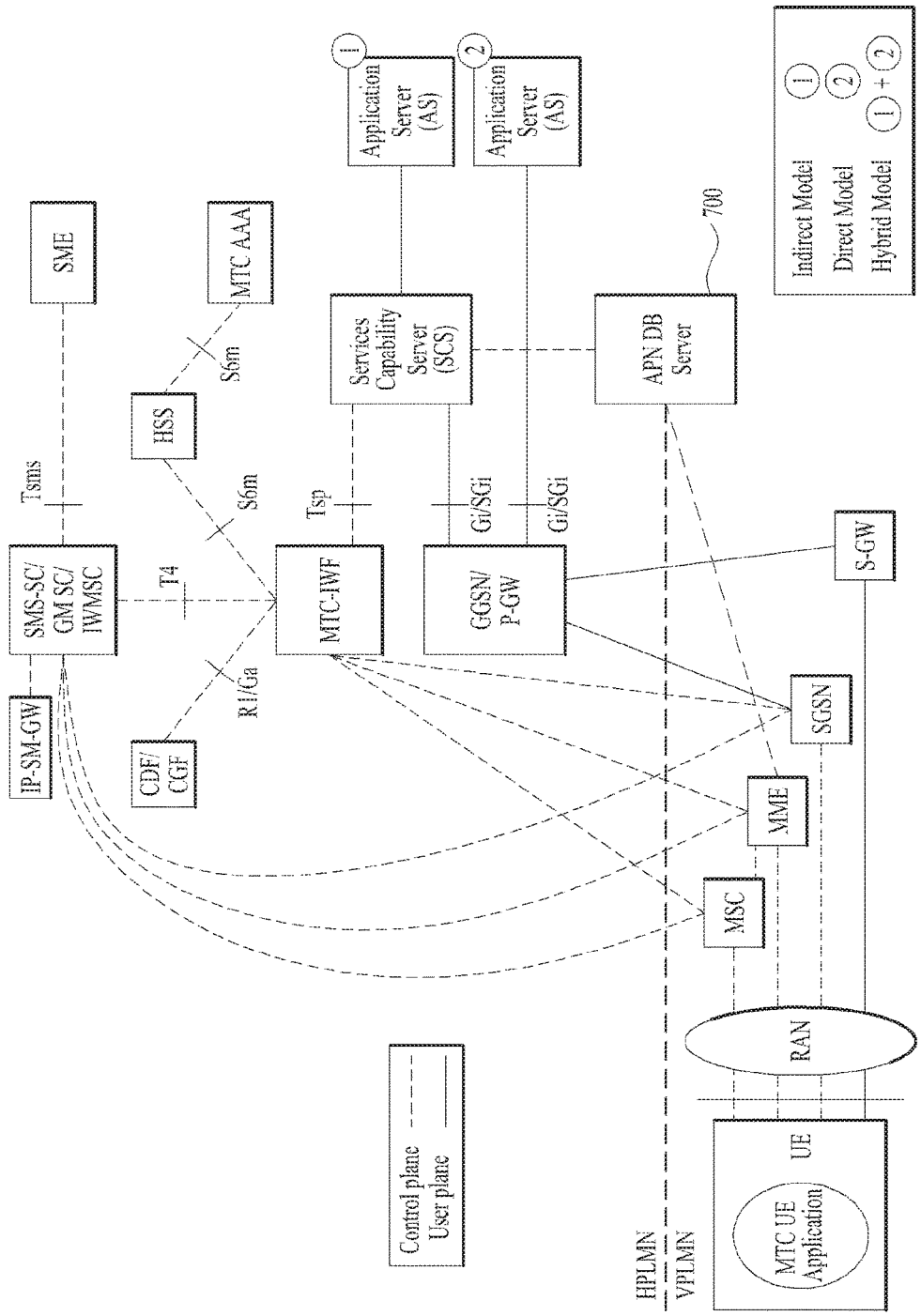
FIG. 7 is a diagram illustrating an architecture related to an SCEF (service capability exposure function).
Figure 8:
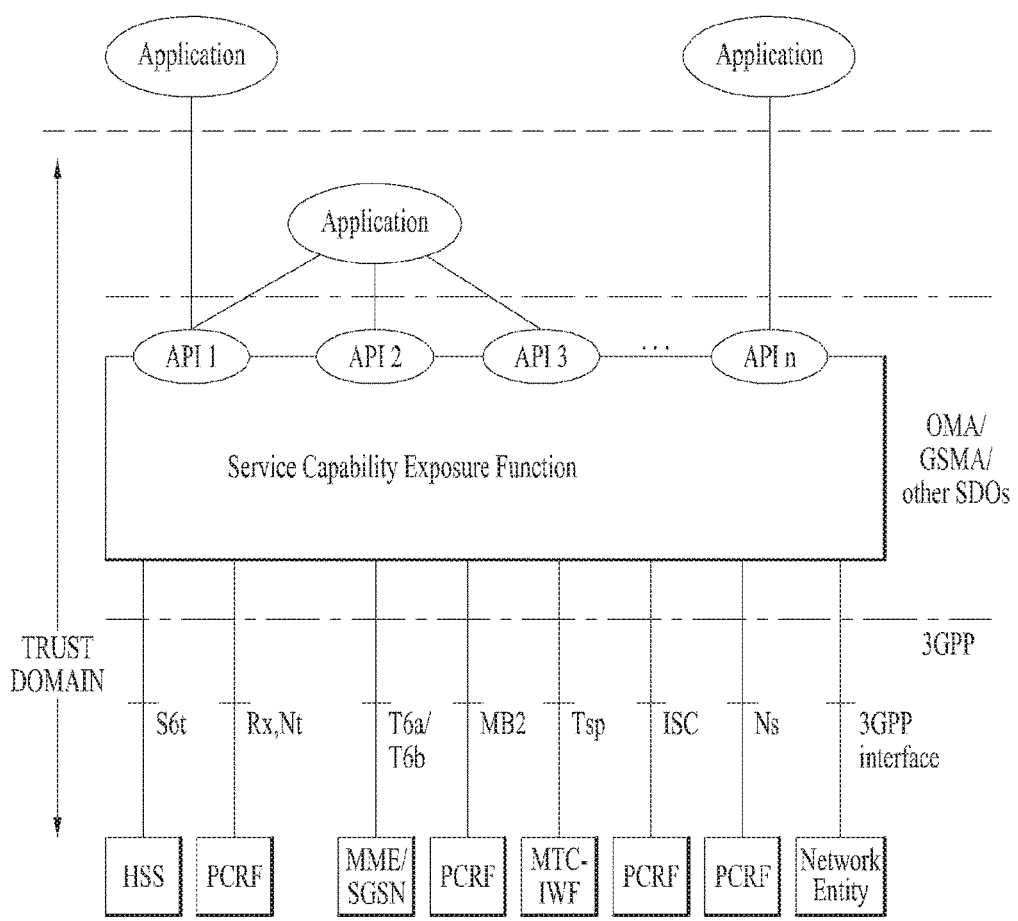
FIG. 8 is a diagram illustrating environment in which 3GPP network is connected with an application server via an SCEF.
Figure 9:
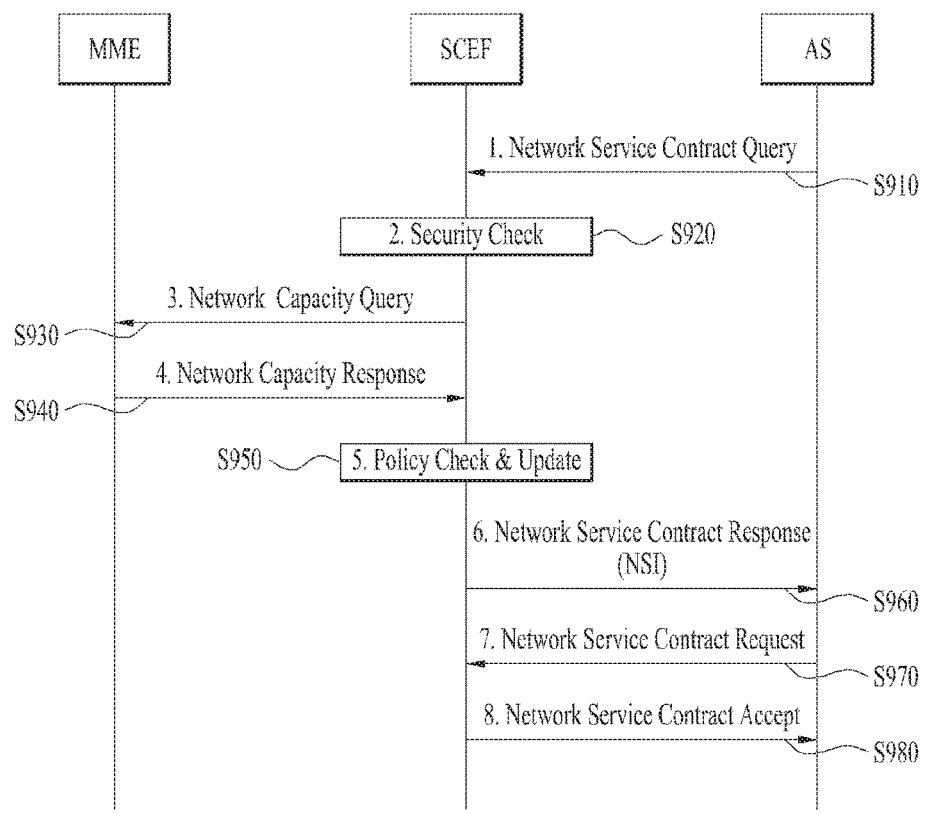
FIG. 9 is a diagram illustrating a procedure of making a contract between 3GPP entity and an application server.

FIGS. 7 to 9 are diagrams for explaining an SCEF (service capability exposure function).

According to 3GPP TS 23.682, 3GPP network provides information on capability of the network to an external service provider. An SCEF corresponds to a platform that makes 3GPP network entity transceive control information with external application servers in a manner of being positioned between the 3GPP network entity and the external application servers. Although the SCEF corresponds to a platform mainly used for mIoT (massive Internet of Things), the SCEF can also be extensively applied to environment for embodiments described in the following. In particular, control information of an application server can be shared with a 3GPP communication service provider via the SCEF and negotiation can be performed between a communication service provider and a provider via the SCEF. Meanwhile, in case of actual data transmission, the data can be transmitted and received in a manner that a P-GW is directly connected with an application server. FIG. 7 is a diagram illustrating an overall architecture related to the SCEF and FIG. 8 is a diagram illustrating environment in which capability of 3GPP network is shared with an external application server via the SCEF.

Meanwhile, each of application service providers can determine a service to be contracted with 3GPP network via an interface between 3GPP network entity and external application servers. For example, information on whether to sponsor a specific service provider or a specific application data, information on a data rate supported by an application service provider, information on a contract, and the like are negotiated via the SCEF.

FIG. 9 is a diagram illustrating a procedure of making a contract between an external application server and a 3GPP entity in the abovementioned environment. An application server transmits a network service contract query message to the SCEF [S910]. The application server inquires of a network about a service provided by the network via the network service contract query message. Having received the message, the SCEF verifies whether or not the application server corresponds to a reliable server [S920] and asks an MME to transmit information on a service and capability capable of being provided by a corresponding network [S930].

The MME transmits information on capability of the MME and a service capable of being provided by the MME to the SCEF [S9410]. For example, information on a data rate (Mbps) capable of being provided, information on whether or not a specific service (e.g., data service for IoT) is provided, information on whether or not QoS data service appropriate for audio/video service is provided, and the like can be transmitted to the SCEF. The SCEF checks and updates policy information stored in the SCEF using the information received from the MME [S950]. For example, the SCEF may set a different charging policy according to time.

Subsequently, the SCEF transmits information on a network of the SCEF to the application server [S960]. For example, price information related to data transmission, information on a data bearer service type capable of being supported by the SCEF, and the like can be transmitted to the application server. The application server determines whether to request a service supply contract of the application server to a network corresponding to the SCEF based on a message received from the SCEF. If the application server determines to use the network related to the SCEF, the application server requests a data amount required by the application server, information on a user list, an IP related to an application, and the like to the SCEF [S970]. In this case, having received the request from the application server, the SCEF generates an APN related to the application server and transmits information on the APN to the MME. Or, if a separate server (e.g., APN DB server) for storing an APN value exists in a network, the SCEF stores APN information related to a newly contracted application in the separate server 700 of FIG. 7). If the SCEF determines to provide a service to the SCEF, the SCEF transmits a response signal to the application server [S980]. The application server makes a sponsored contract with a network service provider via the aforementioned series of procedures.

Figure 10:
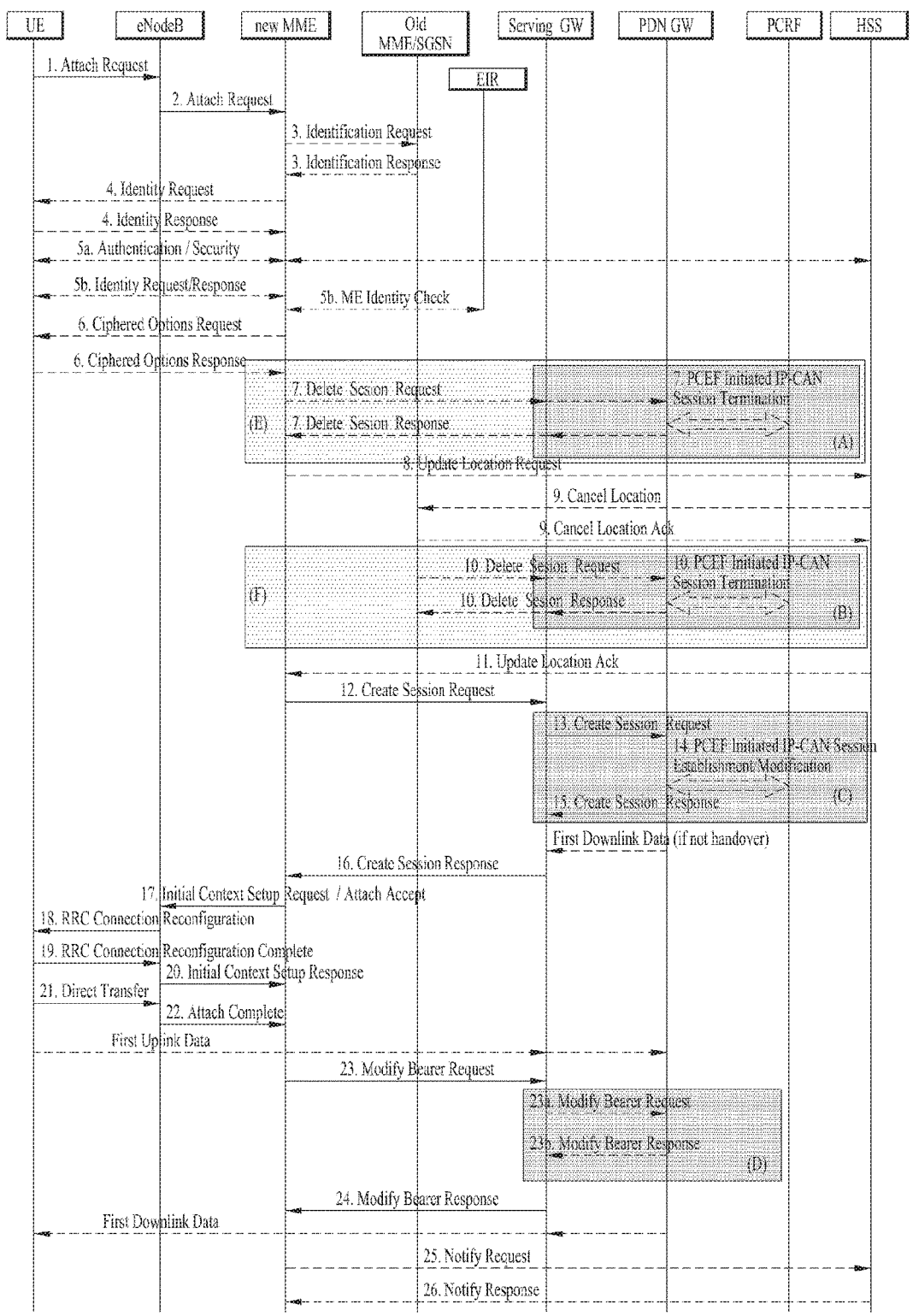
FIG. 10 is a diagram illustrating an attach procedure of a terminal.

3. Method for Terminal to Perform Attach Procedure Proposed in the Present Invention FIG. 10 is a diagram illustrating an attach procedure of a UE. According to the attach procedure shown in FIG. 10, a UE starts to access a network by forwarding an attach request message to an MME via an eNB. Subsequently, having received the attach request from the UE, the MME initiates a procedure of generating a PDN connection of the UE (i.e., a procedure of assigning an IP) via an S-GW and a P-GW.

Sponsored connectivity is explained first before an embodiment proposed for the attach procedure is explained. A user does not need to pay all or a part of a charge for the data connection use of the sponsored connectivity. In case of using the sponsored connectivity, payment not requested to the user is paid by a third party (e.g., an application service provider) instead.

As a method of providing sponsored connectivity to a UE, it may consider a scheme of adding a field (e.g., a sponsored connectivity request field) indicating the request of the sponsored connectivity to an attach request message when the UE registers at a network using the attach request message. Having received the attach request message, the network can recognizes that the UE requests the sponsored connectivity. Hence, the network receives subscription information of the UE from a HSS and determines whether to provide the sponsored connectivity to the UE.

Yet, if the sponsored connectivity is generated between the UE and the network according to the aforementioned scheme, all data generated by various applications installed in the UE are going to be delivered to a data network associated with the sponsored connectivity. However, when a network service provider provides the sponsored connectivity, the network service provider will provide the sponsored connectivity according to a condition satisfied by a third party only when the third party providing necessary cost exists. In particular, if a data network managed by the third party is not directly connected with a data network provided by the network service provider, the third party worries about a security problem such as hacking and a problem causing transmission delay and a packet loss due to the inflow of data packets unrelated with the third party delivered to the data network managed by the third party.

Hence, it is necessary to configure a separate network distinguished from other applications for the sponsored connectivity. Yet, in order to use the separate network, it is necessary to separately manage a P-GW between a data network corresponding to sponsored connectivity and a network of a network service provider. In particular, it is necessary to have a P-GW in charge of the data network corresponding to the sponsored connectivity and a P-GW in charge of a data network except the sponsored connectivity, respectively, and a UE should be connected with each of the P-GWs. To this end, the UE transmits a separate APN value to a network and receives an allocation of an IP address from the network to request a separate connection to the data network corresponding to the sponsored connectivity. Having received the separate APN value, the network allocates a data network and a P-GW and routes a data packet corresponding to the sponsored connectivity.

Yet, it is very difficult for the UE to manage information on a P-GW or information on a data network to use a specific application. In particular, since the number of applications capable of being installed in the UE is more than hundreds of thousands and a new application is continuously appearing, it is very difficult to store information on a data network or information on a separate P-GW for each application in the UE in advance. And, since application service providers are able to differently configure a server and a network according to a region and an IP address of each server is flexibly assigned and changeable, it is also difficult to fixedly store mapping information of an application/data network/P-GW in the UE. Hence, it is required to dynamically allocate APN to the UE.

Figure 11:
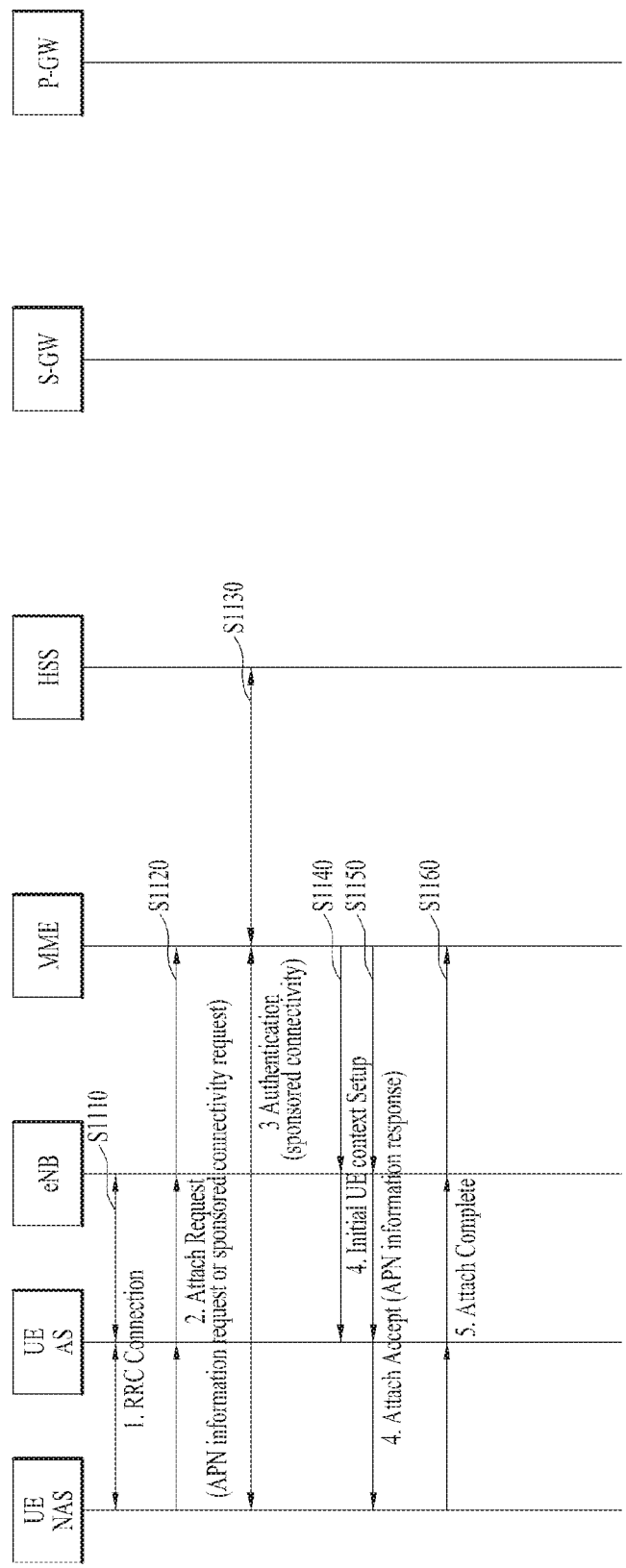
FIGS. 11 to 13 are flowcharts for a method of performing an attach procedure according to a proposed embodiment.
Figure 12:
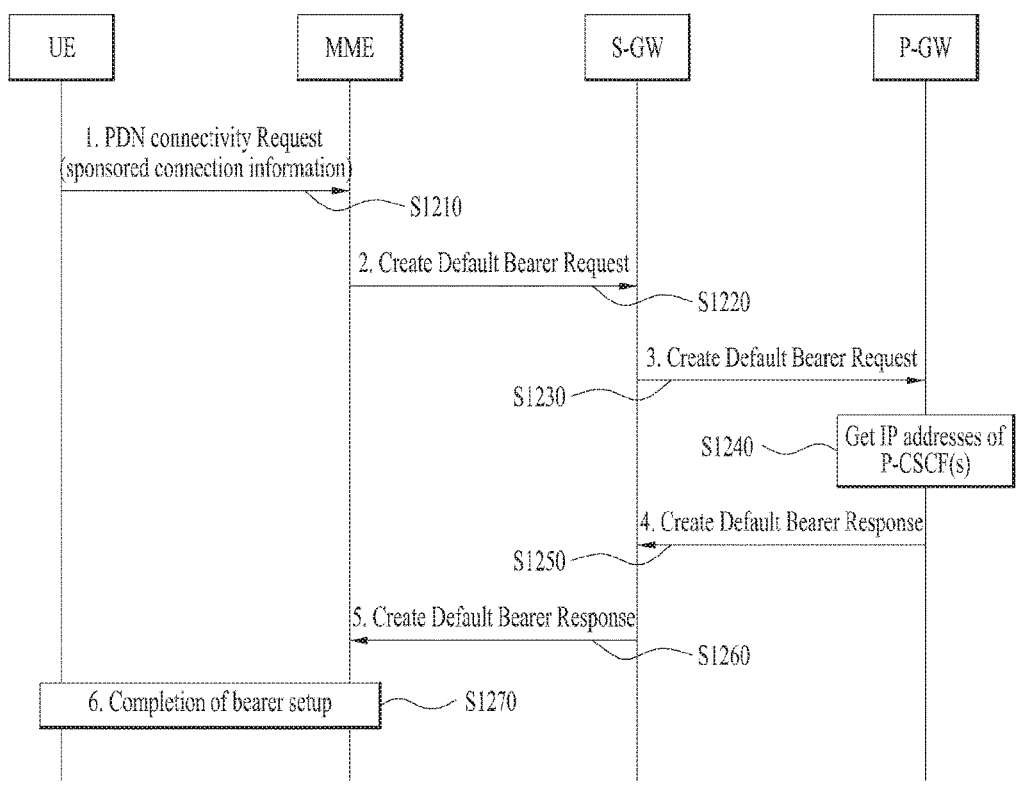
Figure 13:
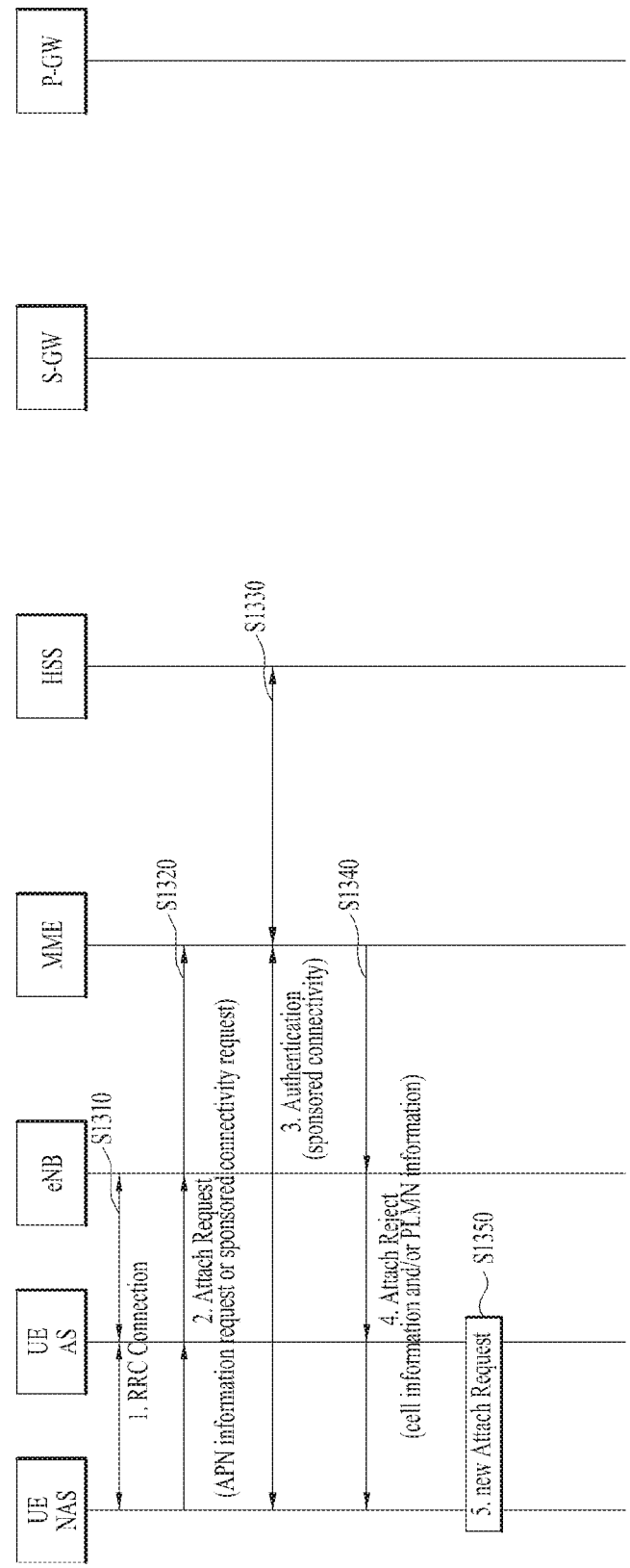

In the following, a method of performing an attach procedure according to embodiments is proposed in consideration of the aforementioned problems. FIGS. 11 to 13 are flowcharts for a method of performing an attach procedure according to a proposed embodiment.

First of all, FIG. 11 shows a process for a UE to dynamically allocate a different APN via an attach procedure. The UE asks a network to inform the UE of an APN capable of being provided by the network via an attach procedure for registering the UE at the network. In particular, when the UE transmits an attach request message to an MME, the UE can include information for requesting an APN list in a specific field (e.g., an APN information request field) included in the attach request message [S1120]. Or, a message for requesting an APN list can be implemented by a separate message. In this case, the message can be referred to as an APN information inquiry message.

Meanwhile, since the request of the APN information requested by the UE corresponds to a part of a process for establishing sponsored connectivity, the request of the APN information can be comprehended as the request of sponsored connectivity. In FIG. 11, although it is depicted and explained as the request of the APN information and the request of the sponsored connectivity are performed via the attach procedure, the request of the APN information and the request of the sponsored connectivity can also be performed via a TAU request message of a TAU (tracking area update) procedure. Or, it may be able to define a new message (e.g., a sponsored attach request message) for the sponsored connectivity.

Having received the request of APN information from the UE, the network (or MME) collects a list of APNs permitted to the UE and information related to the APNs in consideration of information related to the UE such as subscription information of the UE, a location of the UE, and the like [S1130]. Subsequently, the network transmits the list of APNs permitted to the UE and the information related to the APNs to the UE [S1150]. The network can transmit the list of APNs and the information related to the APNs to the UE by including the list of APNs and the information related to the APNs in a specific field (e.g., APN information response field) included in an attach accept message. Or, it may be able to define a separate message for transmitting the APN information (e.g., APN information response message). It may be able to utilize a TAU accept message rather than the attach accept message.

Meanwhile, if the network has no APN information to be delivered to the UE, the network explicitly informs the UE of information indicating that there is no APN information. Unlike the aforementioned procedure, although the UE does not explicitly request APN information to the network, the network may deliver the APN information to the UE in a specific situation.

In the following, APN-related information transmitted to the UE by the network is explained in detail. The APN-related information can also be referred to as APN configuration information and can include a service associated with a specific APN and/or information capable of identifying the service associated with the specific APN.

For example, when an APN #1 is connected with a Facebook service, a network can inform a UE that the APN #1 is connected with the Facebook service by providing a service name, a service ID, a service provider, an application ID, an application name and the like of the Facebook to the UE via APN configuration information. Moreover, information on a category of a service associated with a specific APN can be transmitted to the UE as the APN configuration information. For example, when an APN #2 is related to a travel category, the network can transmit the APN configuration information to the UE to indicate that it is able to provide travel-related services to the UE together with the APN #2.

And, the APN configuration information can also include information on an IP flow and a server connected with an APN. For example, the APN configuration information can include information on a website name, an IP address, and a port number capable of being accessed by a specific APN.

And, the APN configuration information can also include information on whether or not a service associated with an APN is provided for free. For example, information on whether or not a service of an APN #1 is provided for free and information on a service provider providing a service for free can also be included in the APN configuration information. Moreover, a condition for receiving a free service via the APN #1 can also be included in the APN configuration information. For example, the condition for receiving the free service may include a type of information delivered to a network or a service provider by a UE, an amount of data capable of being used for free, time capable of receiving a service for free, information on whether or not it is necessary to watch an advertisement, information on a site to be additionally accessed or preferentially accessed to receive a service, and the like. Having received the APN configuration information, the UE forwards the APN configuration information to a related entity or a higher/lower layer.

Meanwhile, the UE receives the APN configuration information by accessing all networks accessible by the UE in a region at which the UE is located, suggests the received information to a user, and may be then able to attempt to register at a specific network according to a final selection of the user. In other word, when there exist a plurality of APNs capable of being connected with the UE, a user of the UE can select an APN to be connected with the UE from among a plurality of the APNs.

Subsequently, FIG. 12 illustrates a process for the UE to generate a PDN connection with a specific APN.

In order to generate a PDN connection with a specific APN based on the received APN configuration information, the UE transmits a PDN connection request message to the network [S1210]. When the UE wants a free connectivity or a sponsored connectivity to the APN, the PDN connection request message can include corresponding information (sponsored connectivity information). As mentioned in the foregoing description, a user does not need to pay all or a part of a charge for the data connection use of the free connectivity or the sponsored connectivity. In case of using the free connectivity or the sponsored connectivity, a third party may pay for the charge instead of the user.

If the network receives the PDN connection request message for requesting the sponsored connectivity for the specific APN from the UE, the network inquires of a server (e.g., APN connectivity authorization server) managing the APN about whether to permit connection of the UE. In this procedure, the network can forward both service subscription information of the UE and identifier information of the UE to the APN connectivity authorization server. The APN connectivity authorization server determines whether to permit the free connectivity or the sponsored connectivity to the UE based on the information and makes a response to the network. If the free connectivity or the sponsored connectivity is permitted by the APN connectivity authorization server, the network generates a PDN connection via an S-GW and a P-GW based on the steps S1220 to S1270. Although it is not explicitly depicted in FIG. 12, if the free connectivity or the sponsored connectivity is rejected by the APN connectivity authorization server, the network can transmit a message to the UE to indicate that a PDN connection is rejected.

Meanwhile, in the aforementioned PDN connection procedure, if a condition of additionally accessing or connecting a specific site for free/sponsored connectivity is included in the APN configuration information, the UE should access the site.

So far, a process of generating sponsored connectivity (free connectivity) via an attach procedure of a UE has been explained. In the following description, an embodiment for a case of failing to perform the attach procedure is explained in detail.

FIG. 13 shows an embodiment for a case that the attach procedure mentioned earlier in FIG. 11 is rejected. As mentioned earlier in FIG. 11, in order to request sponsored connectivity, the UE can transmit an attach request message by including a sponsored connectivity request field in the attach request message. Having received the attach request message, the network can recognize that the UE requests for the sponsored connectivity. The network receives subscription information of the UE from an HSS to determine whether to provide the sponsored connectivity to the UE. If the network determines not to provide the sponsored connectivity to the UE or the network itself does not implement a sponsored connectivity function, the network can transmit an attach reject message to the UE. Having received the attach reject message, the UE is able to know that the UE is unable to generate the sponsored connectivity with the network.

In this case, if the UE receives the attach reject message from the network and the UE does not belong to the network, the UE should perform position registration by transmitting an attach request message to a different network service provider again. In this case, the UE is in a state that the position registration with the network is not performed yet while the UE selects the network, transmits the attach request message to request sponsored connectivity, and receives an attach reject message. In particular, the UE is unable to send an emergency call or receive a cell signal while the position registration is not performed.

Although the UE has transmitted the attach request message to request for sponsored connectivity, the network is unable to support sponsored connectivity to all UEs. For example, assume a case that a service provider makes a contract with a communication service provider to support sponsored connectivity of 100 Mbps or a case that the number of access capable of being simultaneously processed by a service provider corresponds to 100. In this case, if a request exceeding the limit of sponsored connectivity capable of being supported by the service provider at the same time is received, the network transmits an attach reject message to the UE. In this case, although the UE has requested sponsored connectivity to an APN providing the sponsored connectivity, the UE receives the attach reject message. As a result, the UE unnecessary performs an attach procedure and wastes a radio resource. Moreover, the UE is unable to use an internet service while the attach procedure is not properly performed. In other word, if the UE fails to perform the attach procedure related to the sponsored connectivity as soon as possible, the UE may fail to receive a different basic service, thereby having a problem.

As a method for solving the abovementioned problem, although the attach procedure fails, it is necessary to minimize a procedure until the UE performs a new attach procedure. Hence, according to the embodiment proposed in the present invention, when a network entity transmits an attach reject message to the UE [S1340], information on a new cell and/or information on a new PLMN can be included in the attach reject message.

Having received the attach reject message, the UE may camp on the new cell or may quickly establish a connection with the new PLMN. In other word, in order to eliminate a process of searching for the new cell or the new PLMN after the UE received the attach reject message, the network can transmit the attach reject message to the UE in a manner of including information for performing a new attach procedure in the attach reject message. The network can provide information on a cell capable of immediately providing a service to the UE (e.g., a frequency band supported by the cell, PCI (physical cell ID) information, etc.) using the subscription information of the UE included in the attach request message previously received from the UE. Or, the network can include information on a PLMN to be selected by the UE in the attach reject message to make the UE attempt to attach using the PLMN. Having received the attach reject message indicating that the sponsored connectivity has failed, the UE quickly selects a new cell based on the information on the cell and/or the information on the PLMN included in the message, transmits a new attach request message, and may be able to generate a new PDN connection [S1350]. In particular, it is able to minimize attach shutdown time via the aforementioned embodiment.

According to a different embodiment, the APN configuration information can be implemented in a form of RRC signaling rather than NAS signaling. For example, an eNB can deliver the APN configuration information to a UE using an SIB (system information block). In particular, information on whether or not each of networks capable of being accessed at a position of the eNB supports free connectivity or sponsored connectivity can be delivered to the UE via the SIB. In this case, the UE forwards the APN configuration information, which is delivered via the SIB, to a higher layer and may be able to select a cell on which the UE camps based on the APN configuration information.

In a network scanning procedure, the UE searches for a PLMN and an operator capable of being accessed at a location at which the UE is positioned. If a higher layer or a user requests free connectivity or sponsored connectivity, the UE preferentially attempts to camp on and access a PLMN providing the free connectivity or sponsored connectivity. In this case, the PLMN providing the free connectivity or sponsored connectivity corresponds to a PLMN indicated by the APN configuration information received via the SIB. Or, when a manual network selection mode is operating and information on a searched PLMN is delivered to a higher layer, information on whether or not the PLMN supports free connectivity or sponsored connectivity can also be delivered to the higher layer.

Meanwhile, it is impossible for a network service provider to provide sponsored connectivity to all UEs requiring the sponsored connectivity. The network service provider can provide the sponsored connectivity to a UE only when there exists a third party presenting a charge for providing the sponsored connectivity. And, the network service provider provides a data transmission service to traffic permitted by the third party only. Yet, a terminal of a user operates based on such an operating system supporting various applications as Android and iOS. Each of the applications generates various types of data packets at various times. In some cases, packets incapable of being recognized by a user can be transmitted as well. For example, most of chatting applications transmits a message to an application server to indicate that an application of a user is maintained and the application is in the background while not in a sleep state.

In this case, if data packets of the applications correspond to a service provided by the third party, it is able to support the service using sponsored connectivity with no problem. However, if the data packets are irrelevant to the service provided by the third party, the network service provider is unable to charge for the data. If the network service provider asks the user of the terminal to pay for the data, since a data packet unintended by the user is charged, a problem may occur on the premise of the sponsored connectivity due to an unintentional situation.

Hence, when sponsored connectivity is provided, it is necessary to have a procedure for preventing traffic not permitted by an operating system of a UE from being transmitted and received. In particular, it is necessary to have a solution for a case that sponsored connectivity provided by a network service provider does not cover all services used by a terminal of a user.

In order to solve the abovementioned problem, when a network supports free connectivity or sponsored connectivity to specific sites and services only, the network can additionally inform a UE of information on the sites and the services. Since the UE receives a data packet only from an application, the UE is unable to know connectivity between an application and a data packet generated by the application. Hence, in relation to sponsored connectivity, the network can inform the UE of information (e.g., information on IP address, information on a port, etc.) on a data packet permitted to be transmitted by the UE. The information can be delivered to the UE together with information indicating that sponsored connectivity is provided.

Having received the information on the data packet, which is permitted in relation to the sponsored connectivity, the UE checks data packets requested to be transmitted by an application. If an IP address or a port of the data packets is not matched with a permitted IP address or a port received from the network, the UE does not transmit the data packet to the network. In particular, the UE transmits data packets, which are permitted to be transmitted in the middle of sponsored connectivity, to the network only.

According to a further different embodiment, the UE may inquire of the network about whether or not the network supports free connectivity or sponsored connectivity before the UE requests the free connectivity or the sponsored connectivity to the network. The UE can inquire of the network about whether or not the network supports the free connectivity or the sponsored connectivity when the UE registers at the network. The UE can additionally transmit information necessary for the network to determine whether or not the network supports the free/sponsored connectivity to the UE to the network. For example, the UE can transmit information (e.g., a site address, an IP address, etc.) on a site to be accessed by the UE and interest information (e.g., game, travel, etc.) of the UE to the network.

If the network determines that the network is able to support the free connectivity or the sponsored connectivity according to the inquiry of the UE, the network transmits information on a configuration (or, bearer configuration) for a PDN connection of the UE to the UE. In this case, the network can additionally transmit information related to the free connectivity or the sponsored connectivity to the UE. For example, the network can transmit information on a duration of the free connectivity or the sponsored connectivity, information on a site capable of being accessed by the UE, and the like to the UE. The information related to the free connectivity or the sponsored connectivity transmitted to the UE is configured by a format similar to a TFT (traffic flow template) and can be implemented in a manner of filtering data packets of the UE.

If the network determines that the network is unable to support the free connectivity or the sponsored connectivity according to the inquiry of the UE, the network transmits information indicating that the free connectivity or the sponsored connectivity is rejected to the UE. Similar to the scheme mentioned earlier in FIG. 13, the network can inform the UE of information on a site and a service for which the free connectivity or the sponsored connectivity is available, and the like together with the information indicating that the free connectivity or the sponsored connectivity is rejected.

The aforementioned embodiments can also be extensively applied to a different case as well as free connectivity or sponsored connectivity provided by an application service provider. For example, when a general user directly pays for the cost, a UE may utilize an attach request procedure to dynamically receive allocation of a specific APN. In particular, the aforementioned signaling process can be similarly utilized not for a sponsored connectivity or free connectivity but for a different purpose.

Similar to the aforementioned embodiments, it may consider network slicing environment. Information on a new slice can be stored in a slice DB server in the inside of a network whenever a new network slicing type is generated in 3GPP network irrespective of an application server located at the outside of the 3GPP network. For example, information on a list of application services supported by a new slice, information on QoS of a supported data bearer, and the like can be stored in the slice DB server. In this case, as mentioned in the foregoing description, a UE may inquire of a network about a list of slices supported by a specific PLMN via an attach request message and may receive information on the list of slices from the network via an attach accept message.

4. Device Configurations

Figure 14:
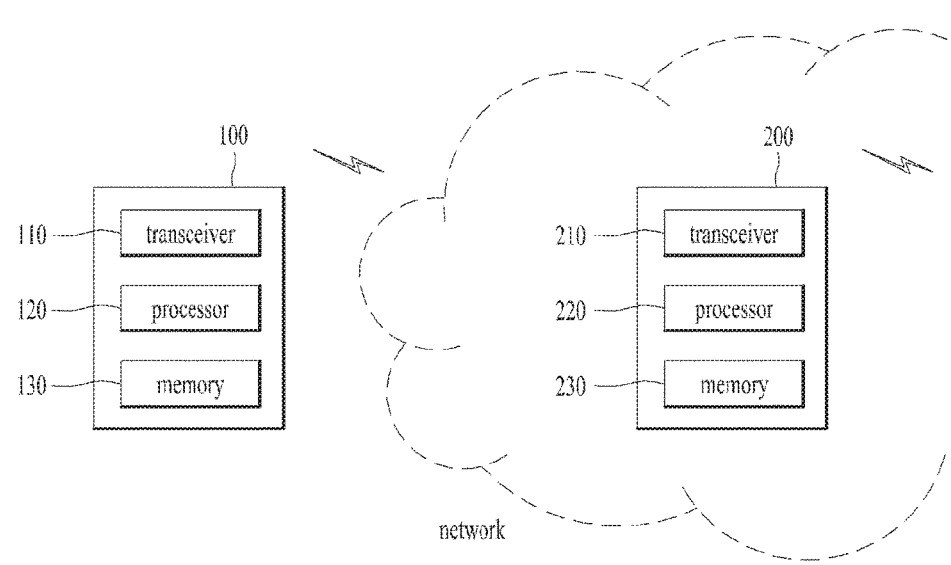
FIG. 14 is a diagram for a configuration of a node device according to a proposed embodiment.

FIG. 14 is a diagram illustrating configurations of node devices according to a proposed embodiment.

A user equipment (UE) 100 may include a transceiver 110, a processor 120, and a memory 130. The transceiver 110 may be configured to transmit and receive various signals, data, and information to/from an external device. Alternatively, the transceiver 110 may be implemented with a combination of a transmitter and a receiver. The UE 100 may be connected to the external device by wire and/or wirelessly. The processor 120 may be configured to control overall operations of the UE 100 and process information to be transmitted and received between the UE 100 and the external device. Moreover, the processor 120 may be configured to perform the UE operation proposed in the present invention. The memory 130, which may be replaced with an element such as a buffer (not shown in the drawing), may store the processed information for a predetermined time.

Referring to FIG. 14, a network node 200 according to the present invention may include a transceiver 210, a processor 220, and a memory 230. The transceiver 210 may be configured to transmit and receive various signals, data, and information to/from an external device. The network node 200 may be connected to the external device by wire and/or wirelessly. The processor 220 may be configured to control overall operations of the network node 200 and process information to be transmitted and received between the network node device 200 and the external device. Moreover, the processor 220 may be configured to perform the network node operation proposed in the present invention. The memory 230, which may be replaced with an element such as a buffer (not shown in the drawing), may store the processed information for a predetermined time.

The specific configurations of the UE 100 and the network node 200 may be implemented such that the aforementioned various embodiments of the present invention can be independently applied or two or more embodiments can be simultaneously applied. For clarity, redundant description will be omitted.

The embodiments of the present invention may be implemented using various means. For instance, the embodiments of the present invention may be implemented using hardware, firmware, software and/or any combinations thereof.

In case of the implementation by hardware, a method according to each embodiment of the present invention may be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code may be stored in a memory unit and be then executed by a processor. The memory unit may be provided within or outside the processor to exchange data with the processor through the various means known to the public.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. Therefore, the present invention is non-limited by the embodiments disclosed herein but intends to give a broadest scope matching the principles and new features disclosed herein.

INDUSTRIAL APPLICABILITY

Although the method of performing an attach procedure is described centering on examples applied to 3GPP LTE system, it may also be applicable to various wireless communication systems including IEEE 802.16x and 802.11x system. Moreover, the proposed method can also be applied to mmWave communication system using a microwave frequency band.

What is claimed is:

1. A method of performing an attach procedure by a user equipment (UE) in a wireless communication system, the method comprising:
    transmitting an attach request message comprising an access point name (APN) information request field to a network entity to request the network entity to inform the UE of an APN providing sponsored connectivity;
    receiving an attach reject message comprising information indicating that the sponsored connectivity is not supported and information for a new attach procedure from the network entity; and
    transmitting a new attach request message to a different network entity based on cell information included in the information for the new attach procedure,
    wherein the information for the new attach procedure comprises public land mobile network (PLMN) information related to the cell information,
    wherein the transmitting the new attach request message comprises:
        accessing a cell via a PLMN which is selected based on the PLMN information; and
        transmitting the new attach request message based on system information received from the cell.

2. The method of claim 1, wherein the cell information included in the information for the new attach procedure comprises frequency band information of the cell and information on a cell ID,
    wherein the cell is capable of immediately providing a service to the UE.

3. The method of claim 1, when an attach accept message comprising information indicating that the sponsored connectivity is supported is received from the network entity, further comprising generating a packet data network (PDN) connection based on the attach accept message.

4. The method of claim 3, wherein the attach accept message comprises a list of APNs where the UE is able to generate sponsored connectivity and APN configuration information related to APNs contained in the list of APNs and wherein the generating the PDN connection transmits a PDN connectivity request message to an APN selected from the list of APNs.

5. The method of claim 4, wherein the APN configuration information comprises at least one selected from the group consisting of identification information of a service mapped to the APNs, category information of the service mapped to the APNs, information on an IP flow or a server connected with the APNs, information on duration of sponsored connectivity supported by the APNs, and information on a condition of the sponsored connectivity supported by the APNs.

6. The method of claim 4, wherein the UE transmits a data packet, which is permitted to be transmitted via the PDN connection, to a network only.

7. The method of claim 1, wherein the sponsored connectivity supports a data communication without a charge for the UE.

8. A user equipment (UE) performing an attach procedure in a wireless communication system, the UE comprising:
    a transmitter;
    a receiver; and
    a processor configured to operate in a manner of being connected with the transmitter and the receiver,
    wherein the processor:
    transmits an attach request message comprising an access point name (APN) information request field to a network entity to request the network entity to inform the UE of an APN providing sponsored connectivity;
    receives an attach reject message comprising information indicating that the sponsored connectivity is not supported and information for a new attach procedure from the network entity; and transmits a new attach request message to a different network entity based on cell information included in the information for the new attach procedure, wherein the information for the new attach procedure comprises public land mobile network (PLMN) information related to the cell information, and wherein the processor accesses a cell via a PLMN which is selected based on the PLMN information and transmits the new attach request message based on system information received from the cell.

9. The UE of claim 8, wherein the cell information included in the information for the new attach procedure comprises frequency band information of the cell and information on a cell ID, and wherein the cell is capable of immediately providing a service to the UE.

10. The UE of claim 8, wherein when an attach accept message containing information indicating that the sponsored connectivity is supported is received from the network entity, the processor generates a packet data network (PDN) connection based on the attach accept message.

11. The UE of claim 10, wherein the attach accept message comprises a list of APNs where the UE is able to generate sponsored connectivity and APN configuration information related to APNs contained in the list of APNs and wherein the processor transmits a PDN connectivity request message to an APN selected from the list of APNs.

12. The UE of claim 11, wherein the APN configuration information comprises at least one selected from the group consisting of identification information of a service mapped to the APNs, category information of the service mapped to the APNs, information on an IP flow or a server connected with the APNs, information on duration of sponsored connectivity supported by the APNs, and information on a condition of the sponsored connectivity supported by the APNs.

13. The UE of claim 11, wherein the UE transmits a data packet, which is permitted to be transmitted via the PDN connection, to a network only.

14. The UE of claim 8, wherein the sponsored connectivity supports a data communication without a charge for the UE.

* * * * *